United States Patent [19]

Hendrickson et al.

[11] Patent Number: 5,030,669
[45] Date of Patent: Jul. 9, 1991

[54] PIGMENT DISPERSIONS

[75] Inventors: William A. Hendrickson; Robin E. Wright; Richard C. Allen; James A. Baker; William M. Lamanna, all of St. Paul, Minn.

[73] Assignee: Minnesota Mining and Manufacturing Company, St. Paul, Minn.

[21] Appl. No.: 524,665

[22] Filed: May 15, 1990

Related U.S. Application Data

[63] Continuation of Ser. No. 199,386, May 27, 1988, abandoned.

[51] Int. Cl.$^5$ ............................................. C08K 5/39
[52] U.S. Cl. ................................. 523/333; 523/106; 106/412; 252/314; 524/88
[58] Field of Search ..................... 252/314; 106/412; 523/333; 524/88

[56] References Cited

U.S. PATENT DOCUMENTS

| | | | |
|---|---|---|---|
| 1,509,824 | 9/1924 | Booth et al. | |
| 1,870,727 | 8/1932 | Hartzell et al. | 252/314 |
| 3,011,979 | 12/1961 | Warner | 252/314 |
| 4,104,276 | 8/1978 | Kranz et al. | 260/314.5 |
| 4,252,421 | 2/1981 | Foley, Jr. | 351/162 |
| 4,576,725 | 3/1986 | Miura et al. | 252/62.51 |
| 4,638,025 | 1/1987 | Fuhrman | 524/40 |

FOREIGN PATENT DOCUMENTS

| | | |
|---|---|---|
| 1544839 | 4/1979 | European Pat. Off. |
| 209403 | 1/1987 | European Pat. Off. |
| 736590 | 9/1955 | United Kingdom |

OTHER PUBLICATIONS

D. J. Walbridge, Solid/Liquid Dispersions, Th.F. Tadros, Ed., Academic Press, 1987, p. 50.
Wagner, et al., *J. Matls. Sci.*, 17, 2781 (1982).
Lambourne, "Paint and Surface Coatings", John Wiley and Sons (1987), p. 159.
Kimura and Bandow, *Bull. Chem. Soc. Japan*, 56, 3578 (1983).
*Physics Today*, Dec. 1987, p. 44.
*J. Vac. Sci. and Tech.*, A5, p. 1375 (1987).
Yatsuya et al., *Jpn. J. Appl. Phys.*, 13, 749 (1974).
Nakatani et al., *J. Magn. Magn. Mater.*, 65, 261 (1987).

*Primary Examiner*—Melvyn I. Marquis
*Assistant Examiner*—David W. Woodward
*Attorney, Agent, or Firm*—Gary L. Griswold; Walter N. Kirn; Lorraine R. Sherman

[57] ABSTRACT

A dispersion and a method therefor wherein the dispersion has composition A or B, wherein A is a nonaqueous dispersion comprising pigment particles having an average size of less than 0.1 micrometer dispersed in an organic medium, and B is an aqueous dispersion comprising certain classes of inorganic pigment particles having an average size of less than 0.1 micrometer dispersed in an aqueous medium, wherein said classes of inorganic pigment particles are selected from the group consisting of metal oxides and metal salts.

The method of the invention comprises the steps of vaporizing a pigment or pigment precursor in the presence of a nonreactive gas stream to provide ultrafine pigment or pigment precursor particles, when pigment precursor particles are present, providing a second gas capable of reacting with said ultrafine pigment precursor particles and reacting said second gas with said ultrafine pigment precursor particles to provide ultrafine pigment particles, transporting said ultrafine pigment particles in said gas stream to a dispersing medium, to provide a dispersion of pigment particles in said medium.

16 Claims, 2 Drawing Sheets

PIGMENT DISPERSIONS

This is a continuation of application Ser. No. 07/199,286 filed May 27, 1988, now abandoned.

FIELD OF THE INVENTION

The present invention relates to dispersions comprising ultrafine pigment particles dispersed in liquid media, articles coated with dispersions of pigment particles, and articles comprising dispersed pigment particles. In other aspects, a process and apparatus for providing such dispersions are disclosed.

BACKGROUND ART

Pigments are widely used as colorants, for example, in paints, varnishes, and inks. Such pigments generally have average particle sizes (diameters) in the range of 0.1 to 10 micrometers, more typically, 1 micrometer or greater. To achieve these particle sizes, mechanical devices are most often used to comminute solid particulate into smaller primary particles. The most common mechanical devices include ball mills, attritors, sand/bead mills, and roll mills. All of these devices require moving parts in order to generate the mechanical forces required to break up the pigment particles. Milling times of several hours are typical, with certain pigments requiring a day or longer in order to break up, or comminute, the particles. Moreover, comminution of the pigment by contact with the milling media results in pigment surfaces exhibiting a high number of surface asperities. Furthermore, contamination of the dispersions from the mechanical parts of the milling equipment can result due to the intimate contact of the pigment with the milling media. Silicon dioxide, a grinding medium, is a common contaminant found after sand milling, for example.

Another inherent disadvantage of mechanical processing of pigments is the large breadth of distribution of particle sizes resulting from mechanical processes. This results in the presence of particles having diameters of one micrometer or greater, even in dispersions where the average particle size is significantly less. For dispersions requiring transparency in the final article, these larger particles lead to unwanted light scattering and are detrimental. The presence of these micrometer sized particles also leads to an inherent instability, or tendency to flocculate, in the dispersions. For a more general description of present limitations in dispersing solids in liquids, see D. J. Walbridge, *Solid/liquid Dispersions*, Th. F. Tadros, Ed., Academic Press, 1987, p. 50.

More stable pigment dispersions can be obtained by chemically altering the pigment as described in EP 1,544,839. This often results in smaller average particle diameters but has the disadvantages of requiring a chemical pretreatment of the pigment, still requiring mechanical milling, and still providing a dispersion having a wide particle size distribution.

Dry organic pigments, as for example members of the phthalocyanine family, have been generated by evaporative techniques. Wagner et al., *J. Matls. Sci.*, 17, 2781 (1982), describes a train sublimator for purification of pigments in the phthalocyanine family with the main purpose of removing impurities present in the as-supplied pigments so as to allow preparation of ultrapure pigment thin films for photovoltaic cells. The only reference to particle size of the purified pigments is for vanadyl phthalocyanine, in which the particle size of the sublimed pigment, even after extensive milling (16 days), could not be reduced below 2 micrometers. A further reduction in particle size was obtained after acid pasting, a technique commonly used to generate pigment grade phthalocyanines (see R. Lambourne, "Paint and Surface Coatings", John Wiley and Sons (1987) p. 159).

H. Toyotama, in EPA 209403, describes a process for preparing dry ultrafine particles of organic compounds using a gas evaporation method. The ultrafine particles, having increased hydrophilicity, are taught to be dispersible in aqueous media. Particle sizes obtained are from 500A to 4 micrometers. These particles are dispersed by use of ultrasound in order to provide mechanical energy to break up the aggregates, a practice known in the art. The resulting dispersions have improved stability towards flocculation.

Kimura and Bandow, *Bull. Chem. Soc. Japan*, 56, 3578 (1983) disclose the non-mechanical dispersing of fine metal particles. This reference describes a method for preparing colloidal metal dispersions in nonaqueous media also using a gas evaporation technique. General references by C. Hayashi on ultrafine metal particles and the gas evaporation technique can be found in *Physics Today*, December 1987, p. 44 and *J. Vac. Sci. and Tech.*, A5, p. 1375 (1987).

Numerous references have appeared describing use of the gas evaporation technique to produce ultrafine metal powders, especially magnetic metal/metal oxide powders (often referred to as magnetic pigments). These refer to a dry process and do not involve contact with liquids. Yatsuya et al., *Jpn. J. Appl. Phys.*, 13, 749 (1974), involves evaporation of metals onto a thin film of a hydrocarbon oil (VERO$ technique) and is similar to Kimura supra. Nakatani et al., *J. Magn. Magn. Mater.*, 65, 261 (1987), describe a process in which surface active agents are used to stabilize a dispersion of a ferromagnetic metal (Fe, Co, or Ni) vaporized directly into a hydrocarbon oil to give a ferrofluid using a metal atom technique. The metal atom technique requires high vacuum (pressures less than $10^{-3}$ torr) such that discrete metal atoms are impinged onto the surface of a dispersing medium before the metal atoms have a chance to contact a second species in the gas phase. In this process, nucleation and particle growth occur in the dispersing medium, not in the gas phase. Thus, particle size is dependent on the dispersing medium and is not easily controlled. Additionally, U.S. Pat. No. 4,576,725 describes a process for making magnetic fluids which involves vaporization of a ferromagnetic metal, adiabatic expansion of the metal vapor and an inert gas through a cooling nozzle in order to condense the metal and form small metal particles, and impingement of the particles at high velocity onto the surface of a base liquid.

Other references for dispersing materials that are delivered to a dispersing medium by means of a gas stream include U.S. Pat. No. 1,509,824 which describes introduction of a molecularly dispersed material, generated either by vaporization or atomization, from a pressurized gas stream into a liquid medium such that condensation of the dispersed material occurs in the liquid. Therefore, particle growth occurs in the dispersing medium, not in the gas phase, as described above. Furthermore, the examples given are all materials in their elemental form and all of which have appreciable vapor pressures at room temperature.

UK patent 736,590 describes a process whereby a finely divided pigment is carried by a gas stream, wetted by a liquid miscible with the final dispersing medium while the finely divided pigment is suspended in the gas stream, and then the wetted pigment is mixed with the dispersing medium. This method requires a pulverizer to first subject the pigment to mechanical forces prior to its introduction into the gas stream. Therefore, it suffers from the shortcomings cited above. Particle sizes on the order of 1 micrometer are obtained.

U.S. Pat. No. 4,104,276 discloses the conversion of crude copper phthalocyanine into a pigmentary form by introducing milled copper phthalocyanine into an organic or aqueous medium together with a basic copper phthalocyanine of specified formula.

Pigmented water-absorbable plastic materials, including contact lenses, are disclosed in U.S. Pat. No. 4,638,025 to contain an organic binder, a pigment, a hydrophilic polymerizable plastic material, and a cross-linking agent. A binder such as cellulose acetate butyrate is required to keep the pigment in a dispersed form.

Contact lenses prepared from hydroxyethyl methacrylate containing copper phthalocyanine (commercially available and then milled) as a colorant are disclosed in U.S. Pat. No. 4,252,421.

SUMMARY OF THE INVENTION

Briefly, in one embodiment, the present invention provides a nonaqueous dispersion comprising pigment particles having an average size (diameter) of less than 0.1 micrometer dispersed in an organic medium.

In another embodiment, the present invention provides an aqueous dispersion comprising certain classes of inorganic pigment particles having an average size (diameter) of less than 0.1 micrometer dispersed in a water or water-containing medium.

The dispersions of the present invention require less time for preparation, are more stable, have a more uniform size distribution, a smaller number average particle diameter, fewer surface asperities, and avoid contamination of dispersed material due to the presence of milling media and the wear of mechanical parts, these problems having been noted above for dispersions prepared by conventional methods employing mechanical grinding of particulates. Additionally, no chemical pretreatment of the pigment is required in order to achieve the fine particle sizes obtained in the final dispersion. The pigments of the dispersions of the present invention are found to have narrower size distributions (standard deviations generally being in the range of $\pm 0.5 \bar{x}$ where $\bar{x}$ is the means number average particle diameter), are more resistant to flocculation [i.e. the dispersions are stable, that is they are substantially free of settled particles, that is, no more than 10% of the particles settle out for at least 12 hours at 25° C.], and demonstrate superior overall stability and color as demonstrated by lack of turbidity, by increased transparency, and by greater tinctorial strength, compared to mechanically dispersed pigment dispersions.

Furthermore, the method requires no mechanical energy, such as ultrasound, in order to break up aggregates. Aggregates do not form since there is no isolation of dry ultrafine pigment particles prior to contacting the dispersing medium.

The dispersions of the present invention, wherein the pigment can be any organic or inorganic pigment or can be generated from a pigment precursor, are prepared by a gas evaporation technique which generates ultrafine pigment particles. Bulk pigment is heated under reduced pressure until vaporization occurs. The pigment vaporizes in the presence of a gas stream wherein the gas preferably is inert (nonreactive), although any gas which does not react with the pigment may be used. The ultrafine pigment particles are transported to a liquid dispersing medium by the gas stream and deposited therein by bubbling the gas stream into or impinging the gas stream onto the dispersing medium.

In another aspect, an article may be coated with a layer of the dispersion of the present invention, to provide, for example, a pigmented layer in a graphic arts construction.

In yet another aspect, the dispersion of the invention can be fabricated into an article containing dispersed particulate therein. For example, a contact lens or a portion thereof can contain copper phthalocyanine as a colorant.

In a still further aspect, the dispersion of the invention can be provided using a unique apparatus for vaporizing pigments and preparing dispersions.

The present invention provides novel dispersions and a novel method of dispersing pigments in liquids that eliminates the problems of conventional grinding methods and has the following advantages as already noted: superior stability towards flocculation over conventionally prepared dispersions, a narrower particle size distribution than found in dispersions prepared using conventional techniques, a smaller mean number average particle diameter than conventional dispersions, and a pigment dispersion free of contamination from milling equipment. Furthermore, the dispersions can be prepared in a wide variety of liquid media. There is no pretreatment or chemical modification of the pigment required to prepare the dispersions of the invention.

In this application:
- "pigment" means any insoluble solid particulate, excluding those comprised solely of an element in its pure form; metal oxides and salts such as metal halides are included; inorganic and organic pigments are included;
- "organic pigment" means a pigment which contains an organic group and which may or may not also contain at least one metal atom;
- "inorganic pigment" means a pigment which contains at least one metal atom but which does not contain an organic group;
- "ultrafine" means having a mean number average diameter of less than 0.1 micrometer, preferably in the range of 0.001 to 0.1 micrometer, more preferably in the range of 0.001 to 0.08 micrometer, most preferably in the range of 0.001 to 0.05 micrometer; and having a standard deviation in the range of $\pm 0.5$ x, where x is the mean number average particle diameter;
- "gas evaporation technique" means any method involving the evaporation of a substance in the presence of a nonreactive gas to provide ultrafine pigment or pigment precursor particulate;
- "metal oxide" means a layer of oxidized metal surrounding a metallic core, and is generated by exposure of ultrafine metal particles to an oxidizing atmosphere;
- "precursor form" means a compound that precedes the formation of another compound; and
- "tinctorial strength" means selective absorption of electromagnetic radiation in the visible range so as to achieve optimum color and clarity.

DETAILED DESCRIPTION

The present invention provides a nonaqueous dispersion comprising organic or inorganic pigment particles or an aqueous dispersion of certain inorganic pigments, the pigment particles having a mean number average particle diameter in the range of 0.001 to 0.1 micrometer dispersed in a dispersing medium. Preferably the mean number average particle diameter is in the range 0.001 to 0.08 micrometer and most preferably 0.001 to 0.05 micrometer. The dispersions can contain pigment from 0.001 to 50% by weight, preferably from 0.001 to 25% by weight, and more preferably, from 0.001 to 10% by weight of the total composition.

The dispersion is prepared by a method comprising the steps:

a) vaporizing a pigment or pigment precursor in the presence of a nonreactive gas stream to provide ultrafine pigment or pigment precursor particles, b) when pigment precursor particles are present, providing a second (reactive) gas capable of reacting with the ultrafine pigment precursor particles, and reacting the reactive gas with the ultrafine pigment precursor particles to convert the ultrafine pigment precursor particles to ultrafine pigment particles, and c) transporting the ultrafine pigment particles suspended in the gas stream to a liquid dispersing medium, as for example, by bubbling the gas containing the particles into or impinging the gas containing the particles onto the dispersing medium, to provide a dispersion of pigment particles in the medium.

Pigments useful in the present invention are well known in the art and are available commercially or can be prepared by methods well known in the art.

Inorganic pigments are nonelemental and can contain any metal but do not contain organics. Inorganic metal-containing pigments include metal oxides and metal salts such as metal silicates, metal halides, metal chromates, metal molybdates, metal plumbates, metal sulfides, and the like. Particularly useful salts and oxides are those of the metals copper, iron, titanium, cobalt, vanadium, magnesium, silver, zinc, and cadmium. Other examples of salts are apparent to those skilled in the art. The process may involve evaporation of the pigment itself, as with CuCl, or may involve evaporation of a precursor form with generation of the actual ultrafine pigment taking place during the transport stage prior to contacting the dispersing medium. An example would be evaporation of iron metal using argon as a nonreactive gas with subsequent exposure of the ultrafine iron particles (pigment precursor particles) to a reactive oxygen environment, thereby forming ultrafine iron oxide coated pigment particles (the particle core being iron) prior to contacting the dispersing medium. Since the reactive gas is introduced at a site remote from the vaporization source after the ultrafine pigment precursor particles have formed, the final ultrafine pigment particles consist of a central core and an outer shell, where the central core can be metal and where the outer shell can be comprised of a layer formed by reaction of the reactive gas with the ultrafine pigment precursor particles.

Organic pigments include those containing chromophore groups such as: azo type, phthalocyanine type, quinacridone type, anthraquinone type, dioxagine type, indigo type, thioindigo type, perynone type, perylene type, isoindolene type, and the like. Other examples are apparent to those skilled in the art.

Representative examples of organic pigments include metal phthalocyanines which are described in detail in "Phthalocyanine Compounds", by F. H. Moser and A. L. Thomas, Rheinhold Publishing Corporation, New York (1963). Typical metal phthalocyanines and phthalocyanine compounds include unsubstituted metal phthalocyanine, aluminum phthalocyanine, aluminum polychlorophthalocyanine, antimony phthalocyanine, barium phthalocyanine, beryllium phthalocyanine, cadmium hexadecachloro phthalocyanine, cadmium phthalocyanine, calcium phthalocyanine, cerium phthalocyanine, chromium phthalocyanine, cobalt phthalocyanine, cobalt chlorophthalocyanine, copper 4-aminophthalocyanine, copper bromochlorophthalocyanine, copper 4-chlorophthalocyanine, copper 4-nitrophthalocyanine, copper phthalocyanine, copper polychlorophthalocyanine, deuteriometal phthalocyanine, dysprosium phthalocyanine, erbium phthalocyanine, europium phthalocyanine, gadolinium phthalocyanine, gallium phthalocyanine, germanium phthalocyanine, hafnium phthalocyanine, halogen substituted metalphthalocyanine, holmium phthalocyanine, indium phthalocyanine, iron phthalocyanine, iron polyhalophthalocyanine, lanthanum phthalocyanine, phenylphthalocyanine, lithium phthalocyanine, lutecium phthalocyanine, magnesium phthalocyanine, manganese phthalocyanine, mercury phthalocyanine, molybdenum phthalocyanine, neodymium phthalocyanine, nickel phthalocyanine, nickel polyhalophthalocyanine, osmium phthalocyanine, palladium phthalocyanine, palladium chlorophthalocyanine, alkoxymetalphthalocyanine, alkylaminometalphthalocyanine, alkylmercaptophthalocyanine, aralkylaminometalphthalocyanine, aryloxymetalphthalocyanine, arylmercaptophthalocyanine, copper phthalocyanine piperidine, cycloalkylaminometalphthalocyanine, dialkylaminometalphthalocyanine, diaralkylaminometalphthalocyanine, dicycloalkylaminometalphthalocyanine, hexadecahydrometalphthalocyanine, imidomethylphthalocyanine, octaazametalphthalocyanine, tetraazametalphthalocyanine, tetra-4-acetylaminometalphthalocyanine, tetra-4-aminobenzoylmetalphthalocyanine, tetra-4-aminometalphthalocyanine, tetrachloromethylmetalphthalocyanine, tetradiazometalphthalocyanine, tetra-4,4-dimethyloctaazametalphthalocyanine, tetra-4,5-diphenyloctaazametalphthalocyanine, tetra-(6-methylbenzothiazoyl)metalphthalocyanine, tetra-p-methylphenylaminometalphthalocyanine, tetramethylmetalphthalocyanine, tetranaphthotriazolylmetalphthalocyanine, tetra-4-naphthylmetalphthalocyanine, tetra-4-nitrometalphthalocyanine, tetra-peri-naphthylene-4,5- octaazametalphthalocyanine, tetra-2,3-phenyleneoxidemetalphthalocyanine, tetra-4-phenyloctaazametalphthalocyanine, tetraphenylmetalphthalocyanine, tetrapyridylmetalphthalocyanine, tetra-4-trifluoromethylmercaptophthalocyanine, tetra-4-trifluoromethylmetalphthalocyanine, 4,5-thionaphtheneoctaazaphthalocyanine, platinum phthalocyanine, potassium phthalocyanine, rhodium phthalocyanine, samarium phthalocyanine, silver phthalocyanine, silicon phthalocyanine, sodium phthalocyanine, thorium phthalocyanine, thulium phthalocyanine, tin chlorophthalocyanine, tin phthalocyanine, titanium phthalocyanine, uranium phthalocyanine, vanadium phthalocyanine, vanadyl phthalocyanine, ytterbium phthalocyanine, zinc chlorophthalocyanine, and zinc phthalocyanine.

Examples of other organic pigments that may be used and which are commercially available include Anthrapyrimidine Yellow (C.I. Pigment Yellow 108), Disazo Yellow GG (C.I. Pigment Yellow 128), Quinacridone Magenta Y (C.I. Pigment Red 122), Phthalo Blue beta (C.I. Pigment Blue 15:3), Phthalo Blue alpha (C.I. Pigment Blue 15:2), Permanent Red 2B (calcium) (C.I. Pigment Red 48:2), Quinacridone Magenta B (C.I. Pigment Red 202), Paliotol TM Yellow 183 (no C.I. No.), Diarylide Yellow (C.I. Pigment 21108), Wachtung Red B (C.I. Pigment Red 48), Perinone Orange (C.I. Pigment Orange 43), Tetrachloroisoindolinone Yellow R (C.I. Pigment Yellow 110), Perylene Red Y (C.I. Pigment Red 224), and Perylene Maroon (C.I. Pigment Red 179). Other examples are apparent to those skilled in the art and may be found in references such as Lambourne (supra).

Several methods are available for characterizing a pigment dispersion. The most common involves the particle size distribution expressed as the weight percentage of pigment falling within a given size range. R. Lambourne, in "Paint and Surface Coatings", John Wiley & Sons, (1987), p. 132, lists the typical size limits for the two major classes of pigments as:

organic pigments 0.01 to 1.00 micrometer (10 to 1000 nm)

inorganic pigments 0.10 to 5.00 micrometer (100 to 5000 nm)

These values are indicative of the overall range of particle sizes typically encountered after conventional dispersion techniques.

The distribution of particle sizes is dependent on the means of particle formation. Where mechanical milling is used to comminute the particles, extremely wide distributions result. For example, EP 1,544,839 describes a method for obtaining easily dispersed copper phthalocyanine that involves chemical pretreatment of the pure pigment. A typical result (from Table 3 of the reference) shows a weight average particle diameter of 0.069 micrometers (69 nm) with a distribution width of 0.440 micrometers (440 nm). Much narrower distributions are obtained by using the instant invention gas evaporation technique.

In contrast to prior art methods of subliming organic pigments as a means of purification, it is believed that the present invention evaporation of organic pigments at subatmospheric pressures in the presence of a nonreactive gas in order to generate ultrafine pigment particles and their direct introduction into a dispersing medium, such as described herein, has not been taught.

As noted above, dry organic pigments have also been generated by H. Toyotama (supra) using a gas evaporation technique. The reference teaches the need to provide mechanical energy in the form of ultrasound which shows that once isolated, the dry pigment particles have an affinity for each other and, therefore, energy must be provided to break the aggregates apart.

The present invention differs from H. Toyotama in that the vacuum provided is dynamic and a constant flow of nonreactive gas stream is swept past the vaporization source, at rates that can be generally in the range of 25 2000 SCCM (standard cc's per minute) for a laboratory apparatus, during pigment evaporation. Thus, while is dependent on the residence time of the ultrafine particles in the growth zone (see Granqvist and Buhrman, *J. Appl. Phys.*, 47, (1976), p. 2200) to determine the ultimate particle size obtained for a given pressure, the instant invention provides a secondary means for particle migration from the growth zone, i.e. convective currents are important as in H. Toyotama (supra) but also the nonreactive gas stream assists in carrying particles from the growth zone. Thus, at a given pressure, the present invention provides particles that are significantly smaller than particles achieved in a static (Toyotama) system. Furthermore, the particles are introduced into the dispersing medium before they have a chance to aggregate, thus removing the need for external mechanical energy, such as ultrasound, to achieve a dispersed state.

Figure 3:
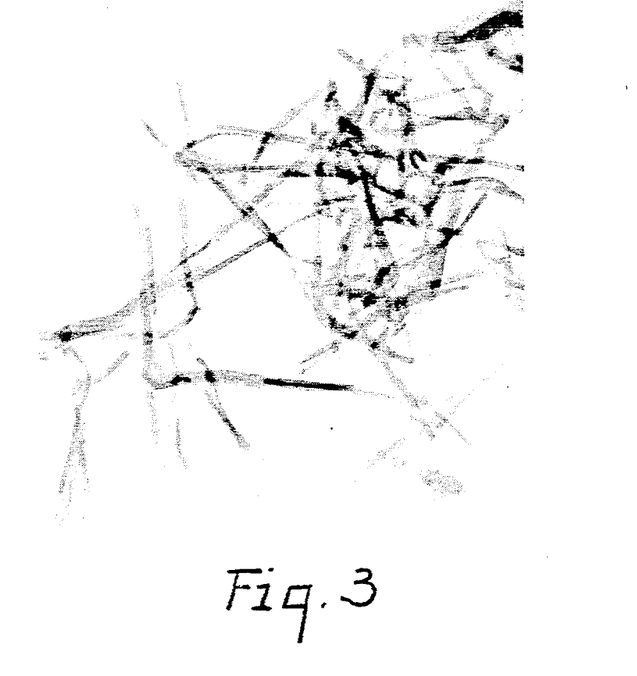
FIG. 3 is a transmission electron micrograph (TEM), 60,000 magnification, of copper phthalocyanine particles prepared by the process of the present invention.
Figure 4:
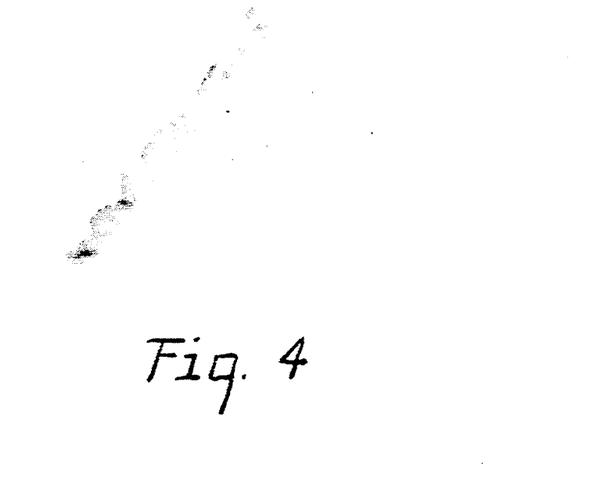
FIG. 4 is a TEM, 60,000 magnification, of a milled prior art particle of copper phthalocyanine.

The advantage of the evaporative technique over conventional milling with respect to particle size and shape is most apparent when organic pigments are used. Typical transmission electron micrographs are shown in FIGS. 3 and 4. FIG. 3 is a TEM which shows copper phthalocyanine particles dispersed in a liquid polymer comprising at least 50 wt. percent perfluoropolyether segments (the polymer is disclosed in U.S. Pat. No. 4,440,918, Example 1) using the process of the instant invention. The particles of FIG. 3 are all within a narrow size range, have a smooth surface, and are essentially free of voids.

FIG. 4 is a TEM which shows a prior art particle of copper phthalocyanine which has been subjected to rotorstator milling for 24 hours in the presence of the same perfluoropolyether medium as in the sample of FIG. 3. It can be seen that the particle has a large number of surface asperities and appears to be a compaction of agglomerates with a large number of voids present. It can be seen that the pigment particles of FIG. 3 are much smaller in size than those shown in FIG. 4.

Dispersing media useful in the present invention include any liquid, aqueous (for certain inorganic pigments) or nonaqueous (for organic and inorganic pigments). Fluids having a viscosity up to 100,000 P or more are envisioned as useful. Preferred viscosities are less than 5000 cP, more preferably less than 3000 cP, and most preferably less than 1000 cP. Representative dispersing media include water, gelatin/water emulsion, alcohol/water, including mixtures such as ethanol/water, glycerol/water, etc. and polar organic liquids such as acetone, 2-butanone, cyclohexanone, 2-undecanone, methanol, ethanol, isopropanol, glycerol, ethylene glycol, ethyl acetate, methyl methacrylate, 2-hydroxyethylmethacrylate, chloroform, methylene chloride, alkylalkanolamines, such as 2-dimethylaminoethanol, 1-dimethylamino-2-propanol, 1-diethylamino-2-propanol, 2-dimethylamino-2-methyl-1-propanol, and 2-dibutylaminoethanol, and combinations thereof.

Useful nonpolar organic liquids include hexane, a mixture of isoparaffinic hydrocarbons, b.p. 156°–176° C.

(Isopar G ™, Exxon, Houston, Tex.), benzene, toluene, xylenes, styrene, alkylbenzenes, and combinations thereof. In addition, liquid polymers such as polydimethylsiloxane (e.g. DC200 ™ $MW_n=200$, Dow Chemical, Midland, Mich.), polydimethyl-co-methylphenylsiloxane (e.g. DC 704 ™, Dow Chemical), polyethylene glycol (e.g. Carbowax ™ 200, Carbowax ™ 400, and Carbowax ™ 600, $MW_n=200$, 400, and 600, respectively, Union Carbide Corp., Danbury, Conn.), a polymer comprising perfluoropolyether segments (LTM ™, 3M, 5 St. Paul, Minn.), and polycaprolactones (Placcel ™ 305, 303, 308, $MW_n=300-850$, Daicel Chemical Ind. Co. Ltd., Tokyo, Japan) may be used.

Additionally, external heat may be applied to melt a solid (e.g., a polymer, a wax, or any low melting organic compound such as naphthalene) and generate a liquid dispersing medium suitable for use in the present invention. Examples of solids that may be used include paraffin wax, low molecular weight polyester (e.g. FA ™-300, Eastman Chemical Co., Rochester, N.Y.), and polyethylene.

The dispersing medium may be a pure liquid or a mixture of liquids and may contain additional ingredients, including inorganic and organic soluble materials and mixtures thereof. Such additives include surface active agents, soluble polymers, insoluble particulates, acids, bases, and salts.

By surface active agent is meant an additive that has a preferred spatial orientation at an interface, e.g. large molecules having a hydrophilic head group and a hydrophobic tail (e.g. OLOA ™ 1200, Chevron Corp., Richfield, Calif., and Amoco ™ 9250, Amoco Chemical Co., Naperville, Ill.). The weight percent of surface active agent to dispersing medium can be from 0 to 20%, preferably 0 to 10%, and more preferably 0 to 5%. Other surface active agents useful in the present invention are well known to those skilled in the art.

Soluble polymers useful as additives in the present invention, for example, in the manufacture of pigmented films, include polystyrene, polystyrene-co-butadiene, poly(methyl methacrylate), poly(ethyl methacrylate), poly(butyl acrylate), poly(4-vinylpyridine), poly(2-vinylpyridine), poly(vinylpyrollidone), poly(2-hydroxyethyl methacrylate), poly(ethylene terephthalate), polystyrene-co-4-vinylpyridine, polystyrene-co-2-vinylpyridine, polyethyleneglycol, poly(ethylene oxide), poly(propylene oxide), polyethylene, polypropylene, poly(acrylonitrile), poly(phenyl vinylene carbonate), poly(vinyl acetate), poly(vinyl alcohol), poly(vinyl trifluoroacetate), poly(vinyl chloride), poly(ethylene-co-propylene adipate), poly(1,4-phenylene sebacate), poly(3,5-dimethyl-1,4-phenylene sulfonate), poly ($\beta$-alanine), poly(hexamethylenesebacamide), poly(vinyl cymantrene-co-4-vinylpyridine), etc. The percent of soluble polymer in the dispersing medium may be from 0 to 70% by weight, preferably 0 to 50%, more preferably 0 to 30%, and most preferably 0 to 25%. Other polymers useful in the present invention are known to those skilled in the art.

Insoluble particulates useful as additives in the dispersing medium of the present invention, for example, in the manufacture of pigmented composite structures, include latex particles, kaolin, alumina, glass microspheres, and other common fillers known to those skilled in the art.

The weight percent of filler compared to the total dispersion can be from 0 to 80%, preferably 0 to 60%, and more preferably 0 to 50%.

The nonreactive gas can be virtually any gas that does not react with the pigment under the conditions of the experiment. Typical choices are He, Ne, Ar, Xe, and $N_2$. Mixtures of two or more nonreactive gases can also be used. When modification of pigments or pigment precursors is desired, a reactive gas can be introduced through a gas inlet that is positioned so as to minimize reaction with the bulk material in the crucible and allow thorough mixing of the reactive gas with the particles entrained in the gas stream, thereby allowing reaction with the particles to occur. The reactive and nonreactive gases generally are at room temperature but the temperature can be elevated or reduced as desired. The term reactive includes 1) direct reaction with the particles, as in the case of metals, for example, with $O_2$, NO, $NO_2$, $CO_2$, CO, $AsH_3$, $H_2S$, $H_2Se$, $NH_3$, trimethylchlorosilane, methylamine, ethylene oxide, water, HF, HCl, or $SO_2$, or combinations thereof, to form the corresponding oxides or other compounds; 2) wetting, as described in UK patent 736,590 to increase dispersibility in which pigment particles are exposed to the vapor of a volatile liquid which may be identical to the dispersing medium or may be miscible with the dispersing medium, prior to contacting the bulk dispersing medium so as to create a solid/liquid interface while the pigment particles are suspended in the gas stream; and 3) adsorption, in which a volatile substance is introduced in the gas prior to contacting the dispersing medium, similar to wetting, but the substance is either not a liquid under normal conditions (atmospheric pressure and 25° C.), the substance is not miscible with the dispersing medium, or else the substance acts to protect the surface of the ultrafine pigment particles from the dispersing medium or additives within the dispersing medium. Typical substances that could be adsorbed include polymers such as poly(methylmethacrylate) and polystyrene, and surface active agents.

Temperatures for evaporation of pigment useful in the method of the present invention depend on the type of pigment being used and generally range from 25° C. to around 500° C. when organic pigments are used and from 25° C. to around 1200° C. when inorganic pigments or inorganic pigment precursors are used.

Temperatures of the dispersing medium useful in the method of the present invention depend on the particular medium being used and generally range from −78° C. to 400° C., preferably from −50° C. to 300° C., and most preferably from 0° C. to 200° C.

Pressures useful in the method of the present invention range from about 0.001 to 300 torr, preferably 0.01 to 200 torr, more preferably from 0.01 to 100 torr, and most preferably from 0.1 to 50 torr. The composition of the combination nonreactive and reactive gas stream can be from about 5 to 100% nonreactive gas or combination of nonreactive gases, preferably from 25 to 100%, more preferably from 50 to 100%. A reactive gas introduced through an additional inlet downstream from the evaporation source can be present as a component in the gas stream in a percent ranging from 0 to about 95%, preferably from 0 to 75%, and more preferably, 0 to 50%.

An apparatus for providing dispersions of ultra fine pigment particles comprises:
 a) a furnace connected to a collection vessel, the furnace containing a heating means (e.g., resistive, inductive, e-beam, infrared, laser, plasma jet) and adapted to contain at least a first and optionally a second gas inlet tube, said second tube being located downstream from said first tube, and a means )e.g., a pump such as a rotary oil pump, an oil diffusion pump, piston pump, a Roots ™ blower, and a turbomolecular pump) for evacuating the furnace and collection vessel, the vessel containing a dispersing medium;

b) means (e.g., a ceramic, plastic, or metal crucible or slab that can be preloaded with material or which can be continuously or batch-wise fed during operation of the apparatus, or the electrodes can be the means) for introducing an organic or inorganic pigment or pigment precursor into said furnace and evacuation thereof;

c) means (e.g., a micro metering valve, electronic flow controller, or gas dispersing tube) for introducing through the first inlet tube a first, non-reactive gas stream into the furnace;

d) means (e.g., energy input as by e-beam, infrared, laser, inductive, resistive, or plasma jet) for evaporating the pigment or pigment precursor particles into the first gas stream;

e) means for allowing condensation of the vaporated pigment or pigment precursor particles (e.g., decreasing the temperature, raising the pressure, changing the chemical nature of the nonreactive gas, controlling the length of the transfer tube, controlling the gas flow rate, or combinations thereof) in the first gas stream to produce a dispersion of ultrafine pigment or pigment precursor particles int eh first gas stream;

f) optionally, means (e.g., a micro metering valve, electronic flow controller, or gas dispersing tube) for introducing into the furnace through the second inlet tube a second, reactive gas stream, to allow reaction with the pigment precursor particles, to provide ultrafine pigment particles;

g) means for collecting said particles in the collection vessel (e.g., bubbling into or impinging particles onto the dispersing medium).

As shown in FIGS. 1 and 2 of the Drawing, apparati 10 and 11, respectively, for providing the present invention dispersions comprise furnace 12 having therein crucible 14 supported by electrodes 15 connected to an external power supply, not shown, and containing vaporizable pigment 16 or pigment precursor 17. Gas inlet tube 18 allows nonreactive gas 19 to be introduced into furnace 12 to envelop and assist in formation of fine particles 20 and facilitate their transportation through transfer tube 22 to collection vessel 24. Collection vessel 24 contains liquid dispersing medium 26 into which transfer tube 22 having tube end 21 allows transported pigment particles 20 and nonreactive gas 19 to bubble into medium 26 (FIG. 1) or it allows transported pigment particles 20 and nonreactive gas 19 being transported through transfer tube 22 having tube end 23 to impinge upon medium 26 (FIG. 2). As shown in FIG. 2, when pigment precursor 17 is vaporized and transported it can be reacted with reactive gas 28 that is introduced through gas inlet tube 30. Transfer tube ends 21, 23 can be used alternatively in either of the FIG. 1 and FIG. 2 apparati. Condensor 32 is provided to return any evaporated liquid from liquid medium 26 back to collection vessel 24. Condensor 32 is connected to trap 38 and pump 40. Pump 40 is used to evacuate entire apparati 10 and 11 prior to and during use. Bypass valve 34 and bypass tube 36 allow for facile evacuation of furnace 12 prior to onset of pigment 16 or pigment precursor 17 evaporation. Valves 42 and 44 allow isolation of apparati 10 and 11 from pump 40.

Other reactor designs to provide dispersions of the invention can be envisioned, including a rotary metal atom reactor such as described in *Metal Vapour Synthesis in Organometallic Chemistry*, J. R. Blackborow and D. Young, Springer-Verlag (New York), 1979 and a spinning disk assembly such as described in *Jpn. J. Appl. Phys.*, 13, 749 (1974). Both types of reactors could be used to generate dispersions of organic pigments.

Additionally, inorganic pigments that can be evaporated directly to generate discrete pigment molecules, such as CuCl and $MgCl_2$, may be used in these reactors to prepare dispersions of the present invention. Where a reactive gas is required to generate the pigment particles, as with metal oxides, these reactors can be modified to be useful. However, the use of a reactor having the design shown in FIGS. 1 and 2 is much preferred in these instances. These and other alterations are within the scope of this invention.

In addition to resistive heating, other means of applying heat to the pigment or pigment precursor may be envisioned. These include laser heating, inductive heating, plasma jet, plasma arc discharge, and others known to those skilled in the art.

In a preferred embodiment the present invention provides ophthalmic devices, for example contact lenses, which are solid (i.e. solidified) dispersions of pigment particles in a polymer, preferably a polymeric hydrogel, more preferably a polymer having perfluoropolyether segments, and ultrafine metal phthalocyanine particles, preferably ultrafine copper phthalocyanine particles, the particles having a mean average particle size of less than 0.1 micrometer. In addition, the particles have a narrow size distribution and the dispersions are transparent, resistant to flocculation, and exhibit greater tinctorial strength as noted above. The amount of metal phthalocyanine pigment present in an ophthalmic device is generally in the range of 0.001 to 5.0 weight percent, preferably 0.001 to 1.0 wt percent, and more preferably 0.001 to 0.1 wt percent. Generally no surfactants or other dispersing aids are required when using the ultrafine particles of the present invention.

The present invention provides ultrafine copper phthalocyanine particles having a 400-fold reduction in average particle size compared to the commercially available superfine grade of copper phthalocyanine.

Contact lenses are colored for reasons of convenience (aid in location or finding a tiny lens) and for cosmetic purposed (change or enhancement of eye iris color). The entire lens may be colored or only a portion can be colored. Pigments are preferred over dyes for hydrophilic lenses because they are more colorfast and do not exhibit leachability (solubility in aqueous systems) as do many dyes. In addition, according to the teachings of the instant invention, they can be readily dispersed.

There are distinct advantages for using ultrafine particles as colorants in contact lenses. The color strength increases and diffuse scattering decreases as the particle size decreases. Where the colored device also refracts light, increased diffuse scattering decreases the resolving power of the lens. For medical devices, it is prudent to minimize the amount of pigment required to achieve a specified level of color; hence, a pigment with the highest color strength is desirable. The optimum color strength of copper phthalocyanine occurs for particle sizes much less than 0.1 micrometer. While molecularly dissolved dyes have maximal color strength with minimal diffuse scattering, water insoluble pigment particles will not bleed or leach from the device during wear or routine handling as has been observed with molecularly dissolved dyes. Dispersions of ultrafine particles are more stable than their larger sized counterparts. This resistance to agglomeration prior to solidification of the liquid polymer makes the manufacturing of a contact lens less sensitive to uncontrollable environmental factors.

The dispersions of the present invention can be used to prepare articles by means of any type of molding, including injection molding and extrusion processes, casting, including spin casting, etc. Such articles include fibers and molded articles including colored ophthalmic devices such as contact lenses. Coated dispersions of the present invention can be used to prepare high quality graphic arts constructions such as sublimation type thermal transfer recording media, and any other applications where dispersed pigment is useful. The coating can be accomplished by any means known in the art including curtain coating, bar coating, knife coating, etc.

Objects and advantages of this invention are further illustrated by the following examples, but the particular materials and amounts thereof recited in these examples, as well as other conditions and details, should not be construed to unduly limit this invention.

EXAMPLE 1 (comparative)

This example describes the formation of a colloidal suspension of copper phthalocyanine in a liquid polymer using high speed fluid energy mill.

A superfine grade of cosmetic grade copper phthalocyanine was obtained from Sun Chemical Corporation, Staten Island, N.Y. (Pigment Blue 15: C48-6552 Lot 095160, 99.0% pure dye content). The manufacturer reported the average particle size to be nominally 1.7 micrometers. Pigment at a concentration of 0.04 weight percent was dispersed into a liquid polymer comprising at least 50 weight percent perfluoropolyether segments (polymer of the type described in Example 1 of U.S. Pat. No. 4,440,918) using a high speed fluid energy mill with a 1 micrometer gap between the rotor and the stator for times in excess of that required to reach and maintain a constant absorption of 600 nm light. The liquid was cloudy and had a distinct purple color. The mean intensity average diameter of the particles in suspension using photon correlation spectroscopy (PCS) was $120\pm450$ nm. As much as 20 percent of the total distribution appeared to be greater than or equal to 1 micrometer in size, accounting for the cloudiness of the suspension.

Additional comonomers and an initiator were added to the mixture to enhance mechanical strength and wettability as described in Example 10 of U.S. Pat. No. 4,440,918. (A comprehensive listing of comonomers is given in U.S. Pat. No. 4,440,918.) The prepolymer mixture (Sample A) was poured into injection molded polypropylene molds whose shapes defined the front and back surfaces of the lenses. The mixture was polymerized by exposure to ultraviolet radiation. The center thickness of representative lenses was 180 micrometers. The lenses appeared gray in color by visual inspection indicating that the tinctorial strength of the pigment in the lens was insufficient to produce a noticeably blue or purple color at that thickness.

EXAMPLE 2

Figure 1:
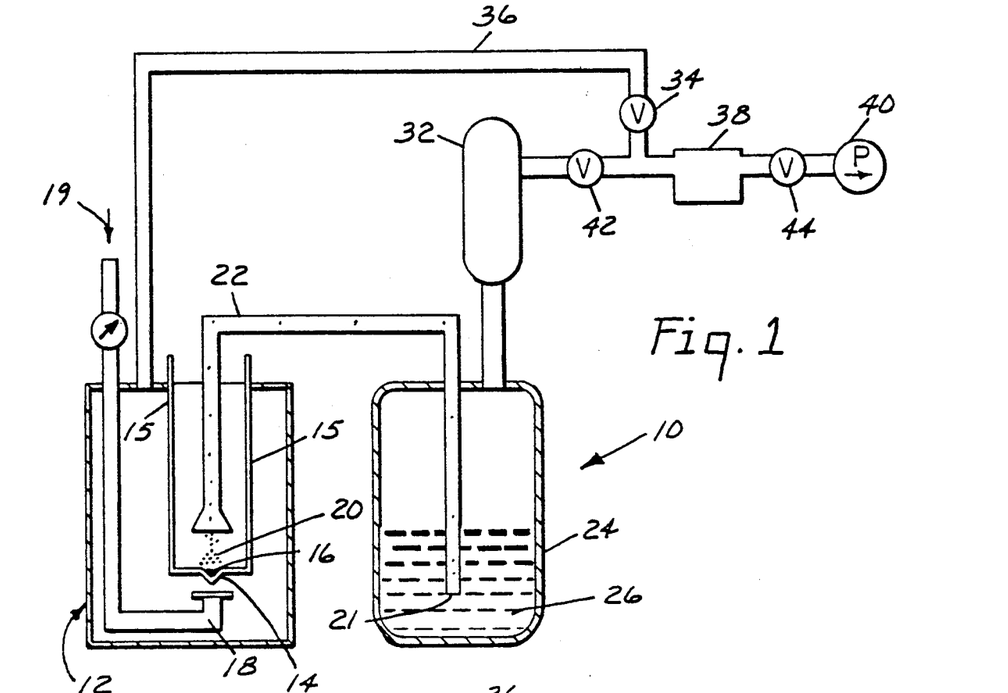
FIG. 1 is a schematic diagram of one embodiment of an apparatus for providing pigment dispersions of the present invention.

This example describes formation of a colloidal dispersion of copper phthalocyanine in a liquid polymer;

Copper phthalocyanine was loaded into an alumina-coated crucible (Sylvania Emissive Products, Exeter, N.H.). The crucible was supported between a pair of water-cooled copper electrodes connected to a 7.5 kw power supply. The reaction vessel was filled with the liquid polymer of Example 1 as the dispersing medium, to a height of approximately 5 cm (2 inches) above the tip of the transfer tube (see FIG. 1). No external cooling of the reaction flask was required since the dispersing medium had a low vapor pressure at room temperature. The dispersing medium was continually stirred by a magnetic stir bar. After evacuating the apparatus to a pressure of less than 1 torr, the flow of argon (typical flow rate approximately 200 sccm) was begun. A dynamic pressure of around 2 torr was maintained. At this point, the bypass valve was closed, thereby displacing liquid from the transfer tube and forcing the gas to bubble directly into the liquid polymer. A corresponding pressure increase to approximately 6 torr was observed. The crucible was slowly heated to evaporate the pigment until the blue color of copper phthalocyanine could be seen in the dispersing medium. Evaporation was continued for approximately 20 minutes at which time the liquid polymeric dispersing medium had become a deep blue color. Photon correlation spectroscopy of the product dispersion showed the pigment to be present as small acicular particles having a mean number average diameter of 13.7 nm (0.0137 micrometer) and an intensity average diameter of $99.7\pm127.6$ nm (0.0997 micrometer). This sample was designated Sample B. By UV-visible spectroscopy, it was shown that there was a noticeable increase in color strength of Sample B as compared to the dispersion of Example 1 (comparative Sample A) as evidenced by the reduced absorption of light in the range of wavelengths from 400 to 600 nm. The colored dispersion was a "sky blue". Furthermore, the dispersion appeared transparent, lacking any of the diffuse scattering observed in the mixture described in Example 1.

In a second trial (Sample C) the gas evaporation conditions were optimized and the number average particle size as measured by photon correlation spectroscopy was reduced to $3.7\pm1.3$ nm ($0.0037\pm0.0013$ micrometer), with an intensity average diameter of $54.2\pm16.3$ nm (0.0542 micrometer).

In both trials of this Example, comonomers and an initiator were added to the colored dispersions, as in Example 1, and lenses were cast for evaluation. Several contact lens wearers were asked to specify for each of the 2 dispersions made in Example 2 and for the dispersion made in Example 1 what concentration of pigment was necessary for them to perceive color in the lens outside of the eye without distorting their sense of color during lens wear. The results are presented in Table I.

TABLE I

Preferred Pigment Concentration Necessary to Impart Color

| Sample | Example | *Particle Size (nm) | Preferred Concentration |
|---|---|---|---|
| A | 1 | 120 ± 450 | 0.040 wt % |
| B | 2 | 99.7 ± 127.6 | 0.015 wt % |
| C | 2 | 54.2 ± 16.3 | 0.008 wt % |

*Intensity Average

The data of Table I show that reduced particle size correlates with reduced optimum concentration of pigment in a contact lens.

For convenience, the polymer comprising perfluoropolyether segments was colored in advance of the time when the comonomers and initiators were added. Therefore, the stability of the colored dispersion was of importance to the manufacturing process of a contact lens. A comparison of the relative stabilities was made for two of the dispersions described in Table I. Stability was assessed as the length of time at which the dispersions first showed signs of flocculation and/or sedimentation as a function of temperature of storage.

TABLE II

| | Stability of Colored Dispersions | |
|---|---|---|
| Temperature degrees (C.) | Stability of Sample A | Stability of Sample B |
| 22 | approximately 1 day | 14 days |
| 6 | approximately 1 day | 6 days |

The data of Table II show that a decrease in pigment size correlates with an increase in the stability of a dispersion, the stability being greater at higher temperatures.

EXAMPLES 3-14

This example provides a general description of the technique used to obtain pigment dispersions in liquid dispersing media using apparatus 10.

Pigment was loaded into an alumina-coated crucible (Sylvania Emissive Products, Exeter, N.H.). The crucible was supported between a pair of water-cooled copper electrodes connected to a 7.5 kw power supply. The reaction vessel was filled with the dispersing medium to a height of approximately 2 inches above the tip of the transfer tube (see FIG. 1). Depending on the dispersing medium used, 1) cooling was provided to maintain the vapor pressure of the dispersing medium sufficiently low, or, 2) the dispersing medium was used at room temperature, or alternatively, 3) heat was applied to melt the medium being used and provide a liquid dispersing medium. After evacuating the apparatus to a pressure of less than 1 torr, the flow of nonreactive gas was begun (typical flow rate about 200 sccm). A dynamic pressure of about 2 torr was maintained. The bypass valve was then closed forcing liquid from the transfer tube and the gas to bubble directly into the liquid dispersing medium. A corresponding pressure increase to 6-10 torr was observed. The crucible was slowly heated until evidence of evaporation (e.g. appearance of color in the dispersing medium). The data are shown in Table III below.

TABLE III

| Example No. | Pigment | Dispersing Medium | Particle Size (PCS), nm |
|---|---|---|---|
| 3 | $MgCl_2$ | ethylene glycol | 57.8 ± 21.1 |
| 4 | perylene red | Carbowax-200 | 1.7 ± 0.6 |
| 5 | Irgazin yellow | glycerin | 12.0 ± 2.9 |
| 6 | VOPc* | glycerin | 25.8 ± 10.6 |
| 7 | CuPc | LTM | 18.0 ± 6.6 |
| 8 | orange GR | cyclohexanone | not measured |
| 9 | CuPc | FA-300 | not measured |
| 10 | AgBr | $H_2O$/0.25% gelatin | not measured |
| 11 | FePc | Carbowax-300 | not measured |
| 12 | CuPc | Isopar G | not measured |

TABLE III-continued

| Example No. | Pigment | Dispersing Medium | Particle Size (PCS), nm |
|---|---|---|---|
| 13 | AgCl | ethyl acetate | not measured |
| 14 | AgCl | methylethyl ketone | not measured |

*Pc means phthalocyanine

EXAMPLES 15-19

These examples show, for each example, a dispersed pigment prepared by evaporating a pigment precursor and providing a reactive gas to prepare pigment particles.

Figure 2:
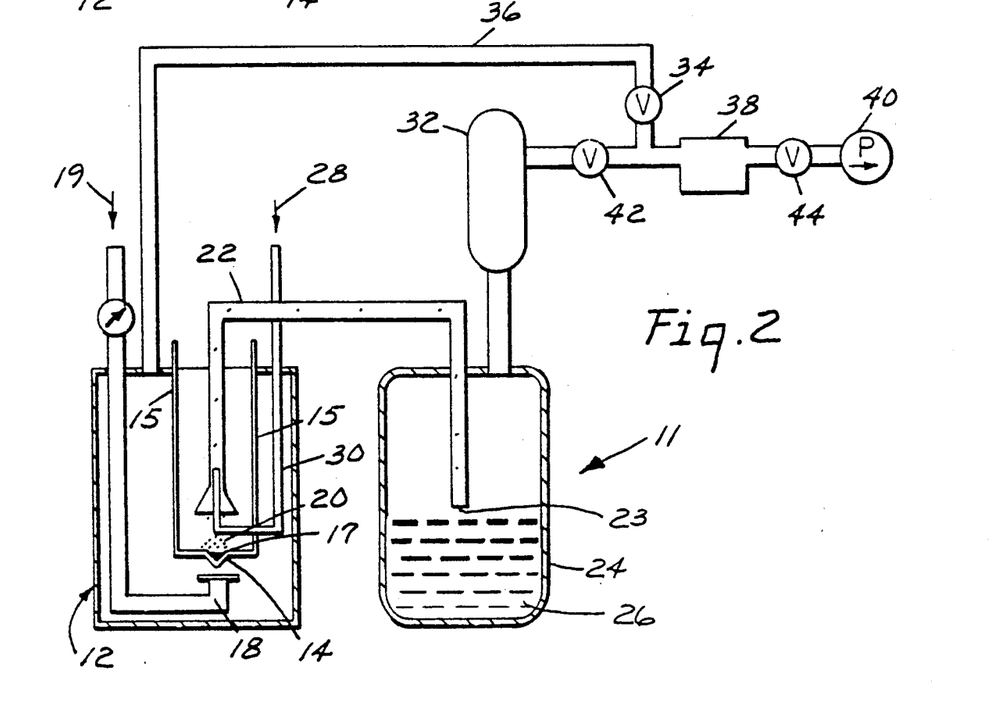
FIG. 2 is a schematic diagram of a second embodiment of an apparatus for providing pigment dispersions of the present invention.

Each pigment precursor was evaporated following the procedure of Example 3-14. During the evaporation, a reactive gas was introduced through the second gas inlet (see FIG. 2).

The pigments, dispersing media, and number average particle sizes are shown in Table VI below.

TABLE IV

| Example No. | Pigment | Dispersing Medium | Particle Size (PCS), nm |
|---|---|---|---|
| 15 | $Ag_2O$ | methylethyl ketone | 11.7 ± 4.5 |
| 16 | $Fe_xO_y$ | cyclohexanone | not measured |
| 17 | $Ag_2O$ | glycerin | |
| 18 | $Ag_2O$ | cyclohexanone | |
| 19 | ZnO | $H_2O$ | not measured |

Various modifications and alterations of this invention will become apparent to those silled in the art without departing from the scope and spirit of this invention, and it should be understood that this invention is not to be unduly limited to the illustrative embodiments set forth herein.

We claim:
1. A method consisting essentially of the steps:
   (a) vaporizing a nonelemental pigment or precursor to a nonelemental pigment in the presence of a nonreactive gas stream to provide ultrafine nonelemental pigment particles or precursor to nonelemental pigment particles,
   (b) when precursor particles to a nonelemental pigment are present, providing a second gas capable of reacting with said ultrafine precursor particles to a nonelemental pigment and reacting said second gas with said ultrafine precursor particles to a nonelemental pigment to provide ultrafine nonelemental pigment particles,
   (c) transporting said ultrafine nonelemental pigment particles in said gas stream to a dispersing medium, to provide a dispersion of nonelemental pigment particles in said medium, said particles having an average diameter size of less than 0.1 micrometer, wherein said method takes place in a reactor under subatmospheric pressure in the range of 0.001 to 300 torr.

2. The method according to claim 1 wherein said pigment is selected from the group consisting of organic and inorganic pigments.

3. The method according to claim 2 wherein said organic pigment contains a chromophore selected from the group consisting of azo, phthalocyanine, quinacridone, anthraquinone, dioxagine, indigo, thioindigo, perynone, perylene, and isoindolene groups.

4. The method according to claim 3 wherein said organic pigment is copper phthalocyanine.

5. The method according to claim 2 wherein said inorganic pigment is selected from the group consisting of metal silicate, metal halide, metal chromate, metal molybdate, metal plumbate, and metal sulfide.

6. The method according to claim 5 wherein said inorganic pigment is a silver salt or oxide.

7. The method according to claim 1 wherein said dispersing medium is an aqueous or an organic liquid.

8. The method according to claim 1 wherein said dispersing medium is a polymer or a melted organic compound.

9. The method according to claim 8 wherein said polymer is a polyester, a perfluoropolyether, or a polyethylene.

10. The method according to claim 1 wherein said nonreactive gas is selected from the group consisting of He, Ne, Ar, Xe, and $N_2$, and combinations thereof.

11. The method according to claim 1 wherein said reactive gas is selected from the group consisting of oxygen, nitrogen dioxide, nitric oxide, carbon dioxide, carbon monoxide, ammonia, trimethylchlorosilane, methylamine, ethylene oxide, HF, HCl, and $SO_2$.

12. The method according to claim 1 wherein said dispersing medium further comprises at least one of a surface active agent, a polymer soluble in said dispersing medium, or insoluble particulate.

13. A method consisting essentially of the steps:
 (a) vaporizing a nonelemental pigment or precursor to a nonelemental pigment in the presence of a nonreactive gas stream to provide ultrafine nonelemental pigment particles or precursor to nonelemental pigment particles,
 (b) when precursor particles to a nonelemental pigment are present, providing a second gas capable of reacting with said ultrafine precursor particles to a nonelemental pigment and reacting said second gas with said ultrafine precursor particles to a nonelemental pigment to provide ultrafine nonelemental pigment particles,
 (c) transporting said ultrafine nonelemental pigment particles in said gas stream to a dispersing medium, to provide a dispersion of nonelemental pigment particles in said medium, said particles having an average diameter size of less than 0.1 micrometer, wherein said method takes place in a reactor under subatmospheric pressure in the range of 0.001 to 300 torr; and wherein said pigment is a metal phthalocyanine and said dispersing medium is a polymer comprising perfluoropolyether segments.

14. The method according to claim 13 wherein said metal phthalocyanine is copper phthalocyanine.

15. A method consisting essentially of the steps:
 (a) vaporizing a nonelemental pigment or precursor to a nonelemental pigment in the presence of a nonreactive gas stream to provide ultrafine nonelemental pigment particles or precursor to nonelemental pigment particles,
 (b) when precursor particles to a nonelemental pigment are present, providing a second gas capable of reacting with said ultrafine precursor particles to a nonelemental pigment and reacting said second gas with said ultrafine precursor particles to a nonelemental pigment to provide ultrafine nonelemental pigment particles,
 (c) transporting said ultrafine nonelemental pigment particles in said gas stream to a dispersing medium, to provide a dispersion of nonelemental pigment particles in said medium, said particles having an average diameter size of less than 0.1 micrometer, wherein said method takes place in a reactor under subatmospheric pressure in the range of 0.001 to 300 torr, and wherein said pigment is an organic pigment.

16. A method consisting essentially of the steps:
 (a) vaporizing a nonelemental pigment or precursor to a nonelemental pigment in the presence of a nonreactive gas stream to provide ultrafine nonelemental pigment particles or precursor to nonelemental pigment particles,
 (b) when precursor particles to a nonelemental pigment are present, providing a second gas capable of reacting with said ultrafine precursor particles to a nonelemental pigment and reacting said second gas with said ultrafine precursor particles to a nonelemental pigment to provide ultrafine nonelemental pigment particles,
 (c) transporting said ultrafine nonelemental pigment particles in said gas stream to a dispersing medium, to provide a dispersion of nonelemental pigment particles in said medium, said particles having an average diameter size of less than 0.1 micrometer, wherein said method takes place in a reactor under subatmospheric pressure in the range of 0.001 to 300 torr, and wherein said pigment is an organic pigment.

* * * * *